United States Patent Office 3,437,680
Patented Apr. 8, 1969

3,437,680
TRICHLORO-BROMOALKYL ISOCYANATES
William J. Farrissey, Jr., North Branford, Francesco P. Recchia, New Haven, and Adnan A. R. Sayigh, North Haven, Conn., assignors to The Upjohn Company, Kalamazoo, Mich., a corporation of Delaware
No Drawing. Filed Aug. 10, 1965, Ser. No. 478,737
Int. Cl. C07c 119/04; C08g 22/18, 22/44
U.S. Cl. 260—453  2 Claims

ABSTRACT OF THE DISCLOSURE

Trichloro-bromo-aliphatic and araliphatic isocyanates are prepared by reacting trichlorobromomethane with an unsaturated isocyanate having the formula $$R-CH=CH-(A)_n-NCO$$

wherein R is hydrogen, lower-alkyl or lower-isocyanatoalkyl, A is lower-alkylene or arylene and $n$ is an integer from 0 to 1. The reaction is carried out at 60 to 150° C. in the presence of a source of free radicals [e.g., 2,2'-azobis(2-methylpropionitrile)]. The isocyanates have the formula:

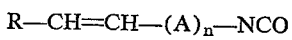

where R, A and $n$ are as above defined, and are useful in the preparation of fire-retardant polyurethanes and in the fireproofing of cellulosic materials.

---

This invention relates to novel isocyanates and is more particularly concerned with halogen-substituted aliphatic, araliphatic, and aromatic mono- and polyisocyanates and with processes for their preparation, and with novel fire retardant polyurethanes produced therefrom.

The preparation of halogenated hydrocarbyl isocyanates has been described previously. For example, mono- and polyhaloaliphatic isocyanates have been prepared by direct halogenation as described in French Patent 1,304,206; polyhalo-α-hydroxyaliphatic isocyanates have been prepared by condensing polyhalo aldehydes and ketones with isocyanic acid as described in U.S. Patent 3,040,082.

Halogen containing isocyanates are useful as intermediates for a variety of purposes, illustratively in the preparation of polyurethanes as will be described in more detail below. The incorporation of a halogen containing isocyanate into the polyurethane structure increases the fire retardant properties of the latter. In the case of halogenated mono isocyanates only a limited amount of said isocyanate can be incorporated into the polyurethane structure since the monoisocyanate acts as chain terminator but in the case of halogenated di- and polyisocyanates a part or all of the polyisocyanate ordinarily used to prepare the polyurethane can be replaced by halogenated polyisocyanate. The degree of fire retardance imparted to a polyurethane in this way is related approximately to the proportion of halogen incorporated therein and hence it is desirable to be able to provide isocyanates containing as high a percentage of halogen as possible.

It is an object of this invention to produce mono- and polyisocyanates which contain a high proportion of halogen. It is also an object of this invention to provide a novel process for the preparation of such compounds. It is a further object of this invention to provide novel fire retardant polyurethane compositions which are derived from halogenated mono and polyisocyanates prepared according to the process of the invention.

The novel process of the invention comprises reacting, in the presence of a free radical source, an unsaturated isocyanate having the formula:

$$R-CH=CH-(A)_n-NCO \qquad (I)$$

wherein R is selected from the group consisting of hydrogen, lower-alkyl and lower-isocyanatoalkyl, A is a divalent radical selected from the group consisting of lower-alkylene and arylene, and $n$ is an integer from 0 to 1, with a haloalkane having the formula:

wherein $R_1$ is selected from the group consisting of chlorine and bromine, $R_2$ and $R_3$ are each selected from the group consisting of chlorine, bromine, cyano, and lower-alkoxycarbonyl, and $R_4$ is selected from the group consisting of bromine and sulfonylchloride, to obtain a compound having the formula:

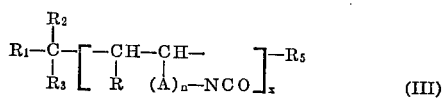

wherein R, $R_1$, $R_2$, $R_3$, A and $n$ are defined above, $R_5$ is selected from the group consisting of chlorine and bromine and $x$ is an integer from 1 to 3, inclusive.

The term "lower-alkyl" as used throughout the specification and claims means alkyl having from 1 to 8 carbon atoms, inclusive, such as methyl, ethyl, propyl, butyl, pentyl, hexyl, heptyl, octyl, and isomeric forms thereof. The term "lower-isocyanatoalkyl" as used throughout the specification and claims means a lower alkyl group as defined above which is substituted by isocyanato. Examples of lower-isocyanatoalkyl are isocyanatomethyl, 2-isocyanatoethyl, 2-isocyanatopropyl, 4-isocyanatobutyl, 4-isocyanatohexyl, 5-isocyanatooctyl, and the like. The term "lower-alkylene" as used throughout the specification and claims means branched or straight chain alkylene having from 1 to 6 carbon atoms inclusive, such as methylene, ethylene, trimethylene, 1,4-butylene, 1,2-propylene, 1,3-hexylene, 1,4-octylene, 1,8-octylene, 2,2-dimethyl-1,4-butylene and the like. The term "arylene" as used throughout the specification and claims means a divalent residue of an aromatic hydrocarbon, preferably one having from 6 to 12 carbon atoms, inclusive, such as phenylene, tolylene, xylylene, naphthylene, diphenylylene, and the like. The term "lower-alkoxycarbonyl" as used throughout the specification and claims means the group —COOAlkyl wherein Alkyl represents lower-alkyl as hereinbefore defined.

The term "free radical source" is used throughout the specification and claims as having the meaning recognized in the art; see, for example, Sosnovsky, Free Reactions in Preparative Organic Chemistry, 1964, pages 1 to 5, Macmillan, New York. Illustrative free radical sources are azonitriles such as 2,2'-azobis(2-methylpropionitrile), 2,2'-azobis(2-methylbutyronitrile), 2,2'-azobis(2-methylhexanenitrile), and the like; peroxides such as di-t-butyl peroxide, benzoyl peroxide and the like; hydroperoxides such as t-butyl hydroperoxide cumene hydroperoxide, and the like; peresters such as t-butyl peracetate, t-butylperbenzoate, t-butyl perphthalate, and the like; and light sources advantageously within the range of 2500 to 6000 Angstrom units. Sources of ultraviolet light or near-ultraviolet light are the preferred light sources.

In carrying out the process of the invention the reactants are brought together in any order. The proportions of reactants employed are generally at least 1 mole and preferably more of the haloalkane (II) per mole of the olefinic isocyanate for producing 1:1 molar adducts. In many instances, depending on the reactivity of the haloalkane (II), the proportion of the latter employed has a significant effect on the degree of telomerization which occurs in the process of the invention. Thus, the principal reaction taking place in the process of the invention is the addition of the haloalkane (II) across the double bond of the unsaturated compound (I). A competing reaction which can occur, particularly in the case where R in compound (I) represents hydrogen, is that of telomerization i.e., condensation of two or more molecules of the compound (I) to form dimers, trimers, etc., with simultaneous addition of the haloalkane across the ends of the polymer chain to form mixtures of compounds having the Formula III above in which $x$ is 2, 3, or even higher, which products are commonly known as telomers.

Where the haloalkane (II) is a highly reactive compound such as carbontetrabromide, bromotrichloromethane, dibromodichloromethane, and the like the degree of telomerization occurring in the process of the invention is low. Using reactive compounds of the above type the principal product is the corresponding compound (III) in which $x=1$, even when the haloalkane (II) is present in the reaction mixture in an amount only slightly in excess of the equimolar proportion with respect to the unsaturated compound (I).

In the case of haloalkanes (II) of lower reactivity than those named above, the degree of telomerization is higher and a significant amount of the product (III) in which $x$ is 2, 3, or higher will be produced if the haloalkane (II) is employed in approximately equimolar proportions. The degree of telomerization can be reduced by employing the haloalkane (II) in excess of equimolar proportions. Thus, by employing the haloalkane (II) in an amount of at least twice and preferably of the order of 4 to 6 times the equimolar proportions based on unsaturated compound (I) the telomerization can be reduced to a minimum or eliminated entirely so that the principal product isolated from the reaction is the compound (III) wherein $x$ is 1.

Where one or both of the reactants (I) and (II) are liquid it is generally found to be unnecessary to employ an inert solvent in the process of the invention. When the haloalkane (II) is a liquid it is frequently convenient to employ an excess of this material (i.e., excess over the stoichiometric proportion based on compound I) to serve the double purpose of acting as solvent for the reaction and suppressing the formation of telomers. However, inert solvents, i.e., solvents which do not take part in the reaction under the conditions employed in the process of the invention, can be employed if desired. Illustrative of such solvents are benzene, toluene, xylene, petroleum ether, hexane, pentane, octane and the like.

The free radical source, when a chemical source is employed, can be added to the mixture of reactants (I) and (II) either in one single addition at the start of the reaction or preferably portionwise as the reaction proceeds. The total amount of chemical free radical source employed whether in one single addition or by multiple additions is generally of the order of about 0.001 mole to about 0.1 mole per mole of the compound (I) and is preferably of the order of about 0.01 mole to about 0.05 mole per mole of the compound (I). When light is employed as free radical source the irradiation of the reaction mixture is generally maintained continuously throughout the course of the reaction in accordance with conventional procedures for such reactions.

The temperature at which the reaction is carried out at a reasonably convenient rate varies according to the free radical source employed. When light, particularly ultraviolet light, is employed as free radical source, the reaction can be carried out advantageously at temperatures of the order of about 0° C. to about 100° C. and preferably at about 25° C. Where azo compounds or peroxides are employed as free radical sources a reaction temperature between about 60° C. and 100° C. at least in the initial stages, is generally convenient. When the free radical source is a hydroperoxide somewhat higher reaction temperatures, of the order of about 100° C. to about 150° C. are generally satisfactory. The exact choice of temperature is one which can readily be determined by trial procedures as will be apparent to one skilled in the art.

The reaction between the compounds (I) and (II) generally takes of the order of fractions of an hour to several hours to attain completion depending upon the particular reactants and free radical sources employed. The progress of the reaction can be followed by conventional procedures, advantageously by spectral analysis to determine the point at which absorption bands corresponding to the double bond in reactant (I) disappear.

The desired product (III) can be isolated from the reaction mixture by conventional procedures. For example the excess of haloalkane (II) and any inert solvent which has been employed can be removed by distillation when the haloalkane has the necessary volatility. The residual compound (III) can be purified, if desired, by conventional procedures such as recrystallization from suitable solvents in the case of a solid, distillation in the case of a liquid, chromatography, counter-current distribution and the like. When the compound (III) is a mixture, for example, when telomerization has occurred during the process of the invention, said mixture can be separated, if desired, into its component parts by conventional techniques such as chromatography, counter-current distribution and the like, or any combination thereof.

The compounds having the Formula III which are produced by the process of the invention are novel compounds. Said compounds, including mixtures of said compounds in which $x$ has a value of 1, 2, 3, or higher, are useful as intermediates in the preparation of fire retardant polyurethanes. For this purpose the monoisocyanates of Formula III can be incorporated as additives in the reaction mixture conventionally employed to prepare polyurethanes, and where the compounds of Formula III are di- or polyisocyanates they can be employed to replace a part or the whole of the polyisocyanate normally employed to replace a part or the whole of the polyisocyanate normally employed in the preparation of polyurethanes. The polyurethanes prepared from isocyanates of the Formula III are themselves novel and form part of the present invention. The amount of the compound (III) which it is necessary to incorporate into a polyurethane to impart a satisfactory level of fire retardancy thereto is such that the resulting polyurethane contains from about 3% to about 15% of halogen by weight and preferably contains from about 5% to about 10% by weight of halogen. By "satisfactory level of fire retardancy" is meant a level such that the polyurethane in question shows a rating of at least "self-extinguishing" in the ASTM D1692–59T procedure in the case of foam and sheeting and in the ASTM D568–56T procedure in the case of a film or coating of 0.05 in. or less in thickness.

The compounds (III) of the invention, including mixtures of two or more of said compounds can be employed in the preparation of any type of polyurethane including cellular and noncellular. They are of particular application in the preparation of cellular polyurethane products. Accordingly, the process of the invention, insofar as it relates to the preparation of fire retardant polyurethanes, will be illustrated by reference to the preparation of cellular products, but it is to be understood that the invention is not to be limited thereto but is of general application to the preparation of polyurethanes of all types.

The various methods for the preparation of polyurethane foams are well known in the art and do not require detailed discussion; see, for example, Dombrow, "Polyurethanes," Reinhold Publishing Corp., New York, pp. 1–105 (1957); Saunders et al., "Polyurethanes," Part I, Interscience Publishers, New York (1962).

One of the commonest procedures consists in reacting a polyol, for example, a polyester or polyether, with an organic polyisocyanate and with water, if necessary in the presence of catalysts, surface active agents or other auxiliary agents, whereby simultaneous interaction between the isocyanate, water and the polyol occurs to give the required foam products. This is the so-called "one-shot" procedure. Alternatively the polyol can be reacted with sufficient polyisocyanate to give an intermediate reaction product containing free isocyanate groups and this product, known as prepolymer, can then be reacted with water, if desired in the presence of catalyst, surface active agents or other auxiliary agents, in order to produce the final foamed product. This latter is the so-called "prepolymer" process. Many variations in the method of carrying out these basic processes are known.

As previously stated, the compounds of the invention having the Formula III can be used as part of the polyisocyanate component, or in the case of polyisocyanates of Formula III can be used as the sole component of the polyisocyanate employed in preparation of the polyurethane. Where an isocyanate other than those of Formula III is employed as part of the polyisocyanate component this isocyanate can be any of the prior art polyisocyanates conventionally used in the preparation of rigid polyurethane foams. Illustrative of such isocyanates are 2,4-tolylene diisocyanate, 2,6-tolylene diisocyante, 4,4'-diphenylmethane diisocyanate, dianisidine, diisocyanate, toluidine diisocyanate, hexamethylene diisocyanate, m-xylylene diisocyanate, 1,5-naphthalene diisocyanate, and other di- and higher polyisocyanates such as those listed in the tables of Siefken, Ann. 562, 122–135 (1949). Mixtures of two or more of the above isocyanates can be used if desired. Preferred polyisocyanates are products obtained by phosgenation of mixtures of methylene-bridged polyphenyl polyamines obtained by the interaction of formaldehyde, hydrochloric acid, and primary aromatic amines, for example, aniline, o-chloraniline, o-toluidine, or mixtures thereof. Such polyisocyanates are known in the art, e.g., U.S. 2,683,730; 2,950,263; and 3,012,008; Canada Patent No. 665,495; and German Patent 1,131,877. A particularly preferred polyisocyanate of this type is the polymethylene polyphenyl isocyanate available commercial from The Upjohn Company, Carwin Division under the trademark PAPI®.

Similarly any of the prior art polyols conventionally employed in the preparation of foams, can be employed in the process of the invention. The polyols conventionally employed in the preparation of polyurethane foams have a hydroxyl number within the range of approximately 180 to approximately 800. The polyols normally used for the preparation of rigid foams are those having a hydroxyl number in the range of approximately 300 to approximately 800.

Illustrative polyols which can be used in preparing polyurethanes according to the invention are polyethers such as polyoxyalkylene glycols for example polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethyleneoxypropylene polyglycols prepared in a similar manner utilizing a mixture of ethylene oxide and propylene oxide or a sequential addition of ethylene oxide and 1,2-propylene oxide; polyether glycols prepared by reacting ethylene oxide, propylene oxide or mixtures thereof with mono- and polynuclear dihydroxy benzenes, e.g., catechol, resorcinol, hydroquinone, orcinol, 2,2-bis(p-hydroxyphenyl)propane, bis(p-hydroxyphenyl) methane, and the like; polyethers prepared by reacting ethylene oxide, propylene oxide, or mixtures thereof with aliphatic polyols such as glycerol, sorbitol, trimethylolpropane, 1,2,6-hexanetriol, pentaerythritol, sucrose or glycosides, e.g., methyl, ethyl, propyl, butyl, and 2-ethylhexyl, arabinoside, xyloside, fructoside, glucoside, rhamnoside, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran and 3,3,5,5-tetrakis(hydroxymethyl) - 4 - hydroxytetrahydropyran; or polyols containing an aromatic nucleus such as 2,2-bis-(hydroxyphenyl)ethanol, pyrogallol, phloroglucinol, tris (hydroxyphenyl)alkanes, e.g., 1,1,3-tris(hydroxyphenyl) ethanes, and 1,1,3-tris(hydroxyphenyl)propanes, etc., tetrakis(hydroxyphenyl)alkanes, e.g., 1,1,3,3-tetrakis(hydroxy-3-methylphenyl)propanes, 1,1,4,4-tetrakis(hydroxyphenyl)butanes, and the like.

A particularly useful polyol for use in preparing polyurethanes according to the invention is a polyol mixture comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of a polyamine mixture, 100 parts of said polyamine mixture containing from 35 to 90 parts of methylene dianilines, the remaining parts being triamines and polyamines of higher molecular weight, said methylenedianilines, triamines, and polyamines of higher molecular weight having been formed by acid condensation of aniline and formaldehyde. Such polyols are available commercially from The Upjohn Company, Carwin Division, under the trade name Carwinols in various equivalent weight ranges.

Illustrative of the polyesters polyols which can be employed in preparing polyurethanes according to the invention are those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably trihydric. Examples of suitable polyols include trimethylolethane, trimethylolpropane, mannitol, hexanetriol, glycerine and pentaerythritol. Small amounts of dihydric alcohols such as ethylene glycol, diethylene glycol, 1,2-propylene glycol, 1,4-butanediol, and cyclohexanediol may also be used. In preparing rigid polyurethane foams it is recommended that no more than about 20% of the hydroxyl groups of the polyester used be supplied by a diol. The above polyesters are typical of those which can be employed in the one-shot, but preferably in the prepolymer, methods of foaming using the process of the invention.

In making rigid foams in accordance with the process of the invention it is advantageous to add a hydroxyl terminated crosslinking polyol to the reaction mixture to form the best network for foam formation. Advantageously the crosslinking polyol should have at least 3 hydroxy groups in the molecule and can be added to the foam reaction mix at any point at which the other polyols are added. Examples of such crosslinking polyols are trimethylolpropane, glycerol, 1,2,6-hexanetriol, pentaerythritol, hydroxyalkylated aliphatic diamines such as N,N, N',N'-tetrakis(2 - hydroxypropyl)ethylenediamine, N,N, N',N'-tetrakis(2-hydroxyethyl)ethylenediamine, and the like, and alkylene oxide reaction products of sugar such as sucrose, and the like.

In preparing polyurethane foams according to the invention, it is desirable, in accordance with conventional procedures, to employ a catalyst in the reaction of the polyisocyanate and polyol. Any of the catalyst conventionally employed in the art to catalyze the reaction of an isocyanate with a reactive hydrogen containing compound can be employed for this purpose; see, for example, Saunders et al., ibid, volume I, pp. 228–232; see also Britain et al., "J. Applied Polymer Science," 4, 207–211, 1960. Such catalysts include organic and inorganic acid salts of, and organometallic derivatives of bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. The preferred catalysts for use in the process and compositions of the invention are the tertiary organic amines of which the following are representative: triethylamine, triethylenediamine, N,N,N',N'-tetramethylethylenediamine, N,N,N', N'-tetraethylethylenediamine, N - methylmorpholine, N-ethylmorpholine, N,N,N',N'-tetramethylguanidine, N,N, N',N'-tetramethyl-1,3,-butanediamine, N,N - dimethylethanolamine, N,N-diethyl ethanolamine, and the like, or mixtures of two or more such amines. The amount of catalyst employed is generally within the range of about 0.1 to about 2.0% by weight based on total weight of reactants in the polyurethane forming reaction mixture.

The ratio of isocyanate groups to active hydrogen containing groups to the polyurethane foam mixtures of the invention is within the normal limits employed in the production of polyurethane foams. Thus said ratio is advantageously wthin the range of from 1.50 to 0.65:1 and preferably within the range of 1.20:1 to 1:1, whether the isocyanate and polyol (i.e., mixture of conventional polyol and polyol of Formula I) are employed separately in the one-shot process or whether the two components have been reacted to form a prepolymer. The lower ratio of ranges of isocyanate to active hydrogen group ratio are used where the polyol is highly functional.

The final foam density of the products produced by the process of the invention can be controlled in accordance with methods well known in the art. For example, this control can be accomplished by regulating the amount of water present in the foam mixture or by using a combination of water and a conventional blowing agent having a boiling point below about 110° C. and preferably below about 50° C. such as a volatile aliphatic hydrocarbon or a volatile highly halogenated hydrocarbon, for example, trichloromonofluoromethane, dichlorodifluoromethane, chlorotrifluoromethane, 1,1 - dichloro - 1 - fluoroethane, 1-chloro-1, 1-difluoro-2, 2-dichloroethane and 1,1,1- trifluoro-2-chloro-2-fluorobutane or mixtures thereof.

Optional additives such as dispersing agents, cell stabilizers, surfactants, flame retardants, and the like which are commonly employed in the fabrication of rigid polyurethane foams, can be employed in the process of the invention. Thus a finer cell structure may be obtained if water-soluble organosilicone polymers are used as surfactants. Organosilicone polymers obtained by condensing a polyalkoxy polysilane with a monoether of a polyalkyleneether glycol in the presence of an acid catalyst are representative of those surfactants which can be used for this purpose. The organosilicone copolymer available from Union Carbide Corporation under the trade name L-5320 is typical of such polymers. Other surfactants such as ethylene oxide modified sorbitan monopalmitate or ethylene oxide modified polypropyleneether glycol may be used, if desired, to obtain better dispersion of the components of the foam mixture.

Other additives such as dyes, pigments, soaps and metallic powders and other inert fillers may be added to the foam mixture to obtain special foam properties in accordance with practices well known in the art.

The fire retardant polyurethanes produced in accordance with the present invention are useful for the purposes for which polyurethanes are conventionally employed. For example, the rigid and semirigid polyurethane foams produced according to the invention are useful for insulating purposes, either as slab stock or in preformed building panels and, because of their ability to hold lubricants and to resist torque, as transmission plates in power transmission systems using fluids, and in similar systems. The flexible foams produced according to the invention are useful for a variety of cushioning, upholstery and like uses. The elastomeric polyurethanes produced in accordance with the invention find application in the preparation of gaskets, flexible tubing and the like.

In addition to their use as fire retardants in the preparation of polyurethanes the compounds of the invention having the Formula III are also useful as compounds which can be employed in the fireproofing of cellulosic material, either synthetic or derived from natural fibre, such as paper, cotton, rayon, cellulose, and the like. Such fireproofing can be accomplished by treatment of fibers prior to fabricating end-products such as sheet material, clothing, upholstery, and the like or by treatment of the end-products themselves. The isocyanates of Formula III and the cellulosic material to be treated are reacted in the presence of a catalyst such as a tertiary amine, for example, triethylamine, triethanolamine, triethylenediamine and the like. Advantageously, the isocyanate is employed as a solution thereof in an inert solvent such as benzene, toluene, xylene, hexane, petroleum ether and the like. The isocyanate reacts with the free hydroxyl groups in the cellulosic material and becomes incorporated therein. The reaction can be carried out at room temperature or higher, for example at temperatures of the order of about 25° C. up to about 100° C. or the reflux temperature of the inert solvent solution employed, whichever is higher. At the completion of reaction the inert solvent is removed, advantageously under reduced pressure. The amount of isocyanate (III) which is employed in the treatment of cellulosic material in this manner is advantageously of the order of about 2% to about 15% by weight of cellulosic material.

The compounds of Formulae I and II which are employed as starting materials in the process of the invention are known compounds which can be prepared by procedures well known in the art.

The following examples describe the manner and process of making and using the invention and set forth the best mode contemplated by the inventors of carrying out the invention but are not to be construed as limiting.

Example 1.—4,4,4-trichloro-2-bromobutyl isocyanate

A mixture of 20 g. (0.238 mole) of allyl isocyanate, 200 g. (1.0 mole) of bromotrichloromethane and 1 g. (0.0061 mole) of 2,2'-azobis(2-methylpropionitrile) was heated under reflux on a steam bath for 3 hours. At the end of this period the excess bromotrichloromethane was removed by distillation under reduced pressure. The residue (69.68 g.) was an orange colored liquid and a portion (29.38 g.) thereof was distilled under vacuum. The fraction having a boiling point of 92 to 94° C. at 0.5 to 0.6 mm. of mercury was collected. There was thus obtained 4,4,4-trichloro-2-bromobutyl isocyanate in the form of a colorless liquid; $n_D^{22}$ 1.5269.

Analysis.—Calculated for $C_5H_5ONBrCl_3$: C, 21.38; H, 1.67; Cl, 37.85. Found: C, 21.55; H, 1.59; Cl, 37.53.

The above material was further characterized by conversion, using an excess of methanol in accordance with conventional procedures, to the corresponding methyl carbamate having a melting point of 64 to 65.5° C.

Analysis.—Calcd. for $C_6H_8O_2NCl_3Br$: C, 23.0; H, 2.9; N, 4.47; Cl, 34.0. Found: C, 22.81; H, 2.73; N, 4.54; Cl, 33.77.

Example 2.—2,4-dibromo-4,4-dichlorobutyl isocyanate

Using the procedure described in Example 1, but replacing bromotrichloromethane by dibromodichloromethane, there is obtained 2,4-dibromo-4,4-dichlorobutyl isocyanate.

Example 3.—2,4,4-tribromo-4-chlorobutyl isocyanate

Using the procedure described in Example 1, but replacing bromotrichloromethane by tribromochloromethane, there is obtained 2,4,4-tribromo-4-chlorobutyl isocyanate.

Example 4.—2,4,4,4-tetrabromobutyl isocyanate

Using the procedure described in Example 1, but replacing bromotrichloromethane by carbon tetrabromide, there is obtained 2,4,4,4-tetrabromobutyl isocyanate.

Example 5.—2,4-dibromo-4,4-dicarbethoxybutyl isocyanate

Using the procedure described in Example 1, but replacing bromotrichloromethane by diethyl dibromomalonate, there is obtained 2,4-dibromo-4,4-dicarbethoxybutyl isocyanate.

Example 6.—2-bromo-4-chloro-4,4-dicarbethoxybutyl isocyanate

Using the procedure described in Example 1, but replacing bromotrichloromethane by diethyl bromochloromalonate, there is obtained 2-bromo-4-chloro-4,4-dicarbethoxybutyl isocyanate.

Example 7.—2,4,4-tribromo-4-carbethoxybutyl isocyanate

Using the procedure described in Example 1, but replacing bromotrichloromethane by ethyl tribromoacetate, there is obtained 2,4,4-tribromo-4-carbethoxybutyl isocyanate.

Example 8.—2-bromo-4,4-dichloro-4-carbethoxybutyl isocyanate

Using the procedure described in Example 1, but replacing bromotrichloromethane by ethyl bromodichloroacetate, there is obtained 2-bromo-4,4-dichloro-4-carbethoxybutyl isocyanate.

Example 9.—2,4-dibromo-4-carbethoxy-4-cyanobutyl isocyanate

Using the procedure described in Example 1, but replacing bromotrichloromethane by ethyl dibromocyanoacetate, there is obtained 2,4-dibromo-4-carbethoxy-4-cyanobutyl isocyanate.

Example 10.—2,4-dibromo-4,4-dicyanobutyl isocyanate

Using the procedure described in Example 1, but replacing bromotrichloromethane by dibromomalononitrile, there is obtained 2,4-dibromo-4,4-dicyanobutyl isocyanate.

Example 11.—4-(1-bromo-3,3,3-trichloroproply)phenyl isocyanate

Using the procedure described in Example 1, but replacing allyl isocyanate by 4-vinylphenyl isocyanate, there is obtained 4-(1-bromo-3,3,3-trichloropropyl)phenyl isocyanate.

Similarly, using the procedure described in Example 1, but replacing allyl isocyanate by 3-vinylphenyl isocyanate and 2-methyl-5-vinylphenyl isocyanate, there are obtained 3-(1-bromo-3,3,3-trichloropropyl)phenyl isocyanate and 2 - methyl - 5 - (1 - bromo - 3,3,3-trichloropropyl) phenyl isocyanate, respectively.

Example 12.—1-bromo-2-trichloromethylbutane-1,4-diisocyanate

Using the procedure described in Example 1, but replacing allyl isocyanate by 1-butene-1,4-diisocyanate, there is obtained 1-bromo-2-trichloromethylbutane-1,4-diisocyanate.

Example 13.—1-bromo-2-trichloromethylethane-1,2-diisocyanate

Using the procedure described in Example 1, but replacing allyl isocyanate by ethene-1,2-diisocyanate, there is obtained 1-bromo-2-trichloromethylethane-1,2-diisocyanate.

Example 14.—4,4,4-trichloro-2-bromobutyl isocyanate

Using the procedure described in Example 1, but replacing bromotrichloromethane by trichloromethanesulfonyl bromide, there is obtained 4,4,4-trichloro-2-bromobutyl isocyanate.

Example 15.—1-(p-tosyl)-3-(2-bromo-4,4,4-trichlorobutyl)urea

A mixture of 1.72 g. (0.01 mole) p-toluenesulfonamide, 2.81 g. (0.01 mole) of 4,4,4-trichloro-2-bromobutyl isocyanate, and 0.1 g. of triethylenediamine (as 33% solution in dipropylene glycol) in 60 ml. of toluene was heated under reflux for approximately 2 hours. The resulting mixture was allowed to cool to room temperature (approximately 25° C.) and the solid which separated was isolated by filtration to give 3.1 g. of material having a melting point of 175 to 187° C. A second crop of 0.7 g. having a melting point of 178 to 187° C. was obtained by cooling the mother liquors. The combined crops were refluxed with a mixture of 40 g. of chloroform and 20 ml. of ethanol and the insoluble material was isolated by filtration to give 1.7 g. of material having a melting point of 175 to 185° C. The filtrate was allowed to cool to room temperature and the solid which separated was isolated by filtration to give material having a melting point of 175 to 182° C. The combined crops from these operations were then recrystallized twice (with charcoal treatment) from ethanol to give 0.9 g. of 1-(p-tosyl)-3-2-(2-bromo-4,4,4-trichlorobutyl)urea in the form of a crystalline solid having a melting point of 185 to 186° C. This compound is useful as a vulcanising agent for SBR rubber using procedures well-known in the art. The compound is also useful as a herbicide for the control of broad leaf weeds using formulations and procedures wellknown in the art for this purpose.

Example 16

A polyurethane foam was prepared as follows.

A mixture of 89 g. of Carwinol 151 (a modified alkylene oxide condensate of polyamine; equivalent weight of 130; (The Upjohn Company, Polymer Chemicals Division), 11 grams of Fyrol 6[diethyl N,N-di(2-hydroxyethyl)aminomethanephosphonate; Stauffer Chemical] and 2 g. of DC–201 (organosilicone block copolymer surfactant; Dow Corning) was blended thoroughly by hand. To this mixture were added with stirring 1 g. of N,N,N',N'-tetramethyl-1,3-butanediamine and 1 g. of triethylamine followed by trichlorofluoromethane until the weight of the mixture had increased by 35 g. To the resulting mixture was then added with vigorous stirring 130 g. of a mixture containing 3 parts by weight of PAPI® (a methylene-bridged polyphenyl polyisocyanate, equivalent weight 133, viscosity of 250 cps. at 25° C.; The Upjohn Company) and 1 part by weight of 4,4,4-trichloro-2-bromobutyl isocyanate. The product so obtained was transferred rapidly to a mold (dimensions 7″ x 7″ x 12″) and allowed to foam freely. After curing for 1 week at room temperature (ca. 25° C.) the rigid foam so obtained had the following properties.

Overall density _____lbs./cu. ft.__ 1.9
Percent volume change, 14 days at 158° F. and 100%
  R.H. _____ 9.8
Flame Test (ASTM 1692–59T) _____ Nonburning Similarly, using the above procedure but replacing 4,4,4-trichloro-2-bromobutyl isocyanate by an equivalent amount of any of the other isocyanates described in Examples 2 to 15 above, there is obtained a fire retardant polyurethane foam.

Example 17

A sample of cotton batting was rendered fire retardant using the following procedure.

A 2 g. sample of cotton batting was treated to remove absorbed moisture by immersing it successively in aqueous acetone containing 96% v./v. of acetone, a mixture of equal parts of acetone and toluene, and finally in toluene. The sample so treated was then suspended in a solution containing 3.084 g. of 4,4,4-trichloro-2-bromobutyl isocyanate and 0.3 g. of triethylenediamine in 250 ml. of toluene and the mixture was heated under reflux for 2 hours. At the end of this time, the mixture was cooled and the cotton sample was removed therefrom and freed from excess reaction mixture by gentle squeezing followed by dipping (with gentle squeezing) in successive baths containing equal parts of toluene and acetone and then acetone containing 2% by volume of water to restore the original water content. The cotton sample was finally rinsed quickly with 100% acetone, dried roughly between filter paper and finally by air drying. The dried sample was found to weigh 2.25 g. A second 2 g. sample of cotton batting was treated with solvents exactly as described above except that the solution containing 4,4,4-trichloro-2-bromobutyl isocyanate and triethylenediamine was omitted. This sample formed the control sample. The two samples were then ignited with a flame under identical conditions. The control sample was completely combusted in 9 seconds. 0.1 g. of the treated sample burned for 17 seconds before combustion ceased and a large proportion, about 30% by weight, of material remained as an incompletely combusted mass (residue weight=0.03 g.).

We claim:
1. A compound having the formula:

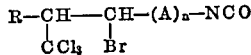

wherein R is selected from the class consisting of hydrogen, lower-alkyl, and lower-isocyanatoalkyl, A is selected from the class consisting of lower-alkylene, phenylene, tolylene, xylylene, naphthylene, and diphenylylene, and $n$ is an integer from 0 to 1.

2. 4,4,4,-trichloro-2-bromobutyl isocyanate.

References Cited

UNITED STATES PATENTS 2,468,208  4/1949  Kharasch _____ 260—658 XR
2,568,859  9/1951  Ladd et al. _____ 260—658 XR

FOREIGN PATENTS 916,275  1/1963  Great Britain.
955,898  4/1964  Great Britain.

OTHER REFERENCES

Strepikheev et al.; Chemical Abstracts, vol. 58, p. 8885 (1963).

CHARLES B. PARKER, *Primary Examiner.*

DOLPH H. TORRENCE, *Assistant Examiner.*

U.S. Cl. X.R.

8—116.2; 106—15; 204—158, 157.1; 252—8.1; 260—2.5, 77.5, 45.9, 465, 465.4, 465.7, 475, 485, 487, 543, 553, 652